United States Patent Office 3,525,717
Patented Aug. 25, 1970

3,525,717
METHOD FOR PREPARATION OF THERMO-PLASTIC POLYURETHANE UREAS
John Henry Butler, Piscataway, Eugene Yue Chieh Chang, Somerville, and Samuel Kaizerman, New Brunswick, N.J., assignors to American Cyanamid Company, Stamford, Conn., a corporation of Maine
No Drawing. Filed Aug. 4, 1966, Ser. No. 570,179
Int. Cl. C08g 22/04, 53/00
U.S. Cl. 260—75    4 Claims

ABSTRACT OF THE DISCLOSURE

A process for the preparation of a thermoplastic polyurethane-urea molding composition of an essentially linear structure which comprises a plurality of structural units having the formula:

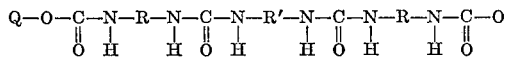

wherein Q represents the residue on removal of the terminal hydroxyl groups from a hydroxyl-terminated polyester or polyether; R is a divalent aromatic radical; and R' is a divalent organic radical in which at least the terminal members are aliphatic; said composition having a melt-flow temperature in the range of 100 and 180° C. and being capable of repeated shapings by injection or compression molding techniques without significant decomposition: said process comprising addition of a 10 to 75% solution of an isocyanate-terminated polyester or polyether intermediate containing less than 1% unreacted diisocyanate in water-miscible solvent, to a 1.0 to 10% solution of a diamine in a mixture of water and water-miscible solvent in the presence of high-speed, high-shear agitation, said solvent being capable of dissolving said isocyanate-terminated polyester or polyether, whereby said molding composition is formed as an easily dried, granular product.

---

This invention relates to an improved method for the preparation of thermoplastic polyurethane-ureas. More particularly, it relates to a method for preparation of thermoplastic polyurethane-ureas of an essentially linear polymeric structure comprising a plurality of structural units of the formula:

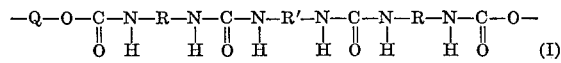

wherein Q represents the residue on removal of the terminal hydroxyl groups from a hydroxyl-terminated polyester or polyether; R is a divalent aromatic radical such as phenylene; and R' is a divalent organic radical in which at least the terminal members are aliphatic such as xylylene; said compositions being further characterized by having melt-flow temperatures below 180° C.; said method of preparation essentially cmoprises adding a water-miscible solvent solution of the appropriate isocyanate-terminated polyester or polyether intermediate to an aqueous water-miscible solvent solution of appropriate diamine in the presence of high-speed, high-shear stirring.

Because of the extreme reactivity between isocyanates and aliphatic amines, a "bulk" polymerization is impossible. One method of handling such reactions is by the solution method. However, due to the poor solubility of the resultant polymer, a solution method usually requires a solvent such as dimethyl formamide, N-methyl pyrrolidone, dimethyl acetamide, and the like. These solvents are generally of high boiling point and possess high tenacity to the polymer so that after completion of the reaction removal of the solvents is extremely tedious and difficult. Any residual solvent remaining in the polymer inevitably will impair the properties greatly.

There exists, therefore, the need for preparative methods which produce the thermoplastic polyurethane-ureas in convenient form, i.e. small granules, and thus eliminate difficult and lengthy drying conditions such as vacuum ovens for several hours, and subsequent granulation of large rubbery masses.

It has now been discovered that the desired moldable thermoplastic polyurethane-ureas are obtained in convenient form capable of being dried easily without vacuum and requiring no additional granulation by adding a water-miscible solvent solution of the appropriate isocyanate-terminated polyester or polyether to an aqueous water-miscible solvent solution of suitable diamine in the presence of high-speed, high-shear agitation. This result is surprising for several reasons. First, in view of the presence of both diamine and water, either of which is capable of reacting with the resulting polymer, it is surprising that a thermoplastic polymer is obtained. Second, in view of the heterogeneity of the reaction mixture and the speed with which the granules are formed, it is surprising that the polymer formed is of sufficient molecular weight to be useful as a moldable thermoplastic composition. The particular polyesters or polyethers that may be employed hereinabove in the function of our new method should have a molecular weight in the range of about 500 to about 5000, preferably 600 to 2500. Among the polyesters that may be employed are those obtained by the reaction of acids such as succinic, glutaric, adipic, pimelic, sebacic, and the like with diols such as ethylene glycol, 1,3-propanediol, 1,4-butanediol, 1,6-hexanediol, etc. Particularly good results are obtained with poly(ethylene adipate). Among the polyethers that may be employed are those obtained from polymerization of alkylene oxides such as 1,2-propylene oxide, 1,3-propylene oxide, 1,4-butylene oxide, etc. as well as mixtures thereof. Particularly good results are obtained using a polyether based on 1,4-butylene oxide.

The polyesters and polyethers described above are hydroxyl terminated. The hydroxyl equivalency of the polyesters or polyethers may be reduced to some extent prior to the reaction with the diisocyanate by initial reaction with monofunctional isocyanate, if desired, in order to control the molecular weight of the final polymer. Alternatively, a monofunctional isocyanate may be substituted for part of the total diisocyanate charge and added with the diisocyanate, if desired, for the same purpose. However employed, the monofunctional isocyanate may be used up to about 10%, preferably 2 to 5%, based on the hydroxyl equivalency when employed. Among the monofunctional isocyanates that may be employed are included phenyl isocyanate, 2-biphenylene isocyanate, p-tolylene isocyanate, xylene isocyanates, and the like. The reaction between polyester or polyether and monofunctional isocyanate when conducted separately may be carried out at 60 to 130° F., preferably 90 to 100° C., in about 1 to 4 hours, preferably 2 to 3 hours.

The polyester or polyether whether or not previously modified as to hydroxyl equivalency is next reacted with a suitable diisocyanate in a manner in which both chain extension and isocyanate termination is effected. This effect is achieved, however, in a manner in which the extended polymer has a residual free isocyanate content of less than about 1%, preferably less than about 0.5%, based on the total polymer. There are several procedures which may be employed to accomplish this effect. One method involves charging a minimum ratio of diisocyanate and reacting under mild reaction conditions so as to effect a high degree of reaction and minimize allophanate linkages and free isocyanate content. An alternative procedure is to charge sufficient excesses of diisocyanate to minimize the allophanate reaction while achieving the desired chain extension and isocyanate termination and them removing the excess free diisocyanate by stripping with or without an added solvent. A third procedure, and a preferred embodiment of the present invention, is to employ diisocyanates having reactive groups of differing reactivity so as to achieve the desired reactions while minimizing the undesired allophanate formation and free isocyanate content without the need for subsequent stripping. The particular method of reaction employed is not especially critical as long as prepolymer formed can be reduced to a free isocyanate content of about 1% or less, as previously indicated.

The ratio of equivalents of diisocyanate to free hydroxy groups in the polyester or polyether may vary from about 1.3 to about 10.0 to 1, preferably 1.6 to 3.2 to 1, depending upon the procedure employed in minimizing the free isocyanate content, as discussed above. Depending upon said procedure, the reaction may be carried at a temperature ranging from about 30 to about 100° C., preferably 50 to 80° C., for from about 4 to about 48 hours, preferably 8 to 24 hours. Among the suitable diisocyanates that may be employed are included 2,4-tolylene diisocyanate, 2,6-tolylene diisocyanate, isomeric mixtures of 2,4- and 2,6-tolylene diisocyanate, 5-nitro-2,4-tolylene diisocyanate, 1-chloro - 2,4 - phenyl diisocyanate, methylenebis(4-phenylisocyanate), methylenebis(3 - methyl-4-phenylisocyanate), and the like to name a few selected members.

The isocyanate terminated polyester or polyether obtained above, after reduction of the free isocyanate content by stripping without solvent under reduced pressure or with solvent by azeotropic distillation or extraction to less than 1%, preferably less than 0.5%, based on the total product, is dissolved in an organic solvent such as tetrahydrofuran, acetonitrile, and the like to form a solution of from about 10 to about 75% polymer content. The particular water-miscible solvent employed is critical and it is preferred that the solvent employed be unreactive with isocyanate groups and have adequate solvating ability for the prepolymer and coreactants and lesser solvating ability for the final polymer. It is also necessary that the solvent allow thorough mixing of the reactants to be effected before gelation of the reaction mixture occurs.

The conventionally prepared isocyanate-terminated polyester or polyether reactant is dissolved in a water-miscible solvent so as to produce a solution containing from about 10 to 75%, preferably 15 to 60%, of said polyester or polyether. Among the solvents that may be employed are included acetonitrile, dimethyl formamide, dimethyl acetamide, tetrahydrofuran, acetone, and the like and mixtures thereof.

Among the diamines which may be employed are aliphatic compounds of the formula:

$$H_2N-CH_2-(A)_n-CH_2-NH_2 \quad (II)$$

wherein A is selected from the group consisting of alkylene of up to about 10 carbon atoms in both cyclic and acyclic arrangement and $n$ is an integer from zero to 1. Suitable diamines falling within this class include ethylene diamine, propylene-1,3-diamine, butylene 1,4-diamine, $\alpha$, $\alpha'$-p-xylylene diamine, $\alpha,\alpha'$-m-xylylene diamine and isomeric mixtures of the latter two diamines.

A separate solution of the diamine reactant is prepared in a mixture of water and water-miscible solvent of the type enumerated above. The concentration of diamine in said solution may vary from about 0.1 to 5.0%, preferably 0.25 to 2.5%. The ratio of water to solvent may vary from about 1:1 to about 5:1, preferably 2:1 to 4:1.

To the diamine solution, if desired, may be added dispersing agents in appropriate amounts. Also, if desired, may be added a monofunctional amine such as diethylamine, di-n-propylamine, di-n-butylamine, and the like. Such addition is for the purpose of molecular weight control in the final polymer and may be in addition to or instead of similar alteration of the isocyanate-terminated polyester or polyether by use of monofunctional isocyanate. Where employed, such monofunctional amine may be used in amounts of up to 10%, preferably 0.5 to 5%, based on the equivalency of the isocyanate-terminated polyester or polyether.

A sufficient quantity of the diamine solution is taken so that the diamine equivalency is about 1 to 50%, preferably 5 to 35%, in excess of the stoichiometric requirements of the isocyanate-terminated polyester or polyether. This solution is placed in a suitable vessel equipped with high-speed, high-shear agitation. To the diamine solution is then added the solution of isocyanate-terminated polyester or polyether with stirring as described. Solid polymer particles start to form almost immediately. Stirring is continued after the addition is complete for from about 2 to 20 minutes, preferably 5 to 10 minutes, after which the polymer is washer, separated, and dried. The temperatures at which the solutions are mixed and stirred may vary widely, but are conveniently at ambient conditions, i.e. 20 to 30° C. Among the high-speed, high-shear stirrers which may be employed are included Eppenbach Mixers, Waring Blendors and the like.

Certain additives in appropriate amounts may be incorporated into the thermoplastic polymers at the appropriate point in the process. Such additives aid in the processing of the final polymer or contribute to the esthetic appeal and include such materials as mold-release agents, colorants, stabilizers, etc. Where soluble, such additives may be incorporated into one of the solutions used to form the final polymer as long as they do not affect the desired reaction. Otherwise, they may be incorporated into the final polymer by milling, for example.

The moldable thermoplastic polyurethane-urea polymers obtained by the process of the present invention may be molded by any of the conventional procedures. Compression molding is a suitable method. The temperature of molding should be at or near the melt-flow temperature, or at about 180° C. or lower. In order to preserve the thermoplasticity of the polymer and to minimize decomposition during molding, it is preferred to use molding temperatures that are as low as possible while still producing the desired properties in the shaped article. Temperatures in the range of 150 to 170° C. are conveniently employed at pressures from 500 to 5000 lbs./in.² Under these conditions no evidence of polymer degradation is observed and the polymer may be reshaped repeatedly without change in properties. The rubbery nature of the polymer renders it quite useful in fabrication of gaskets, etc.

The invention is more fully illustrated by the examples which follow. The relative amounts of ingredients are indicated in parts by total weight unless otherwise noted.

EXAMPLE 1

(A) Prepolymer preparation

To 3080 parts of a hydroxyl-terminated poly(ethylene adipate) of molecular weight 1245 at 52° C. was added 1255 parts of 2,4-tolylene diisocyanate. To this mixture over a period of 60 minutes was added 3120 parts of a hydroxyl-terminated poly(ethylene adipate) of molecular weight 2040. The average molecular weight of the polyesters was 1550 and the equivalency ratio of NCO to OH was 1.8 to 1.0. The reaction mixture was stirred at 60° C. for about 20 hours and then at 70° C. for an additional hour. When cooled the prepolymer had an NCO analysis of 3.46%. Essentially no unreacted diisocyanate was present.

(B) Polymerization

In 1560 parts of acetonitrile was dissolved 652 parts of the product obtained from (A) above. Another solution containing 26.04 parts of butane-1,4-diamine and 5.56 parts of diethylamine (an excess of 20% of amine equivalency over the isocyanate requirements) in 5720 parts of water and 2040 parts of acetonitrile was prepared in a suitable Waring Blendor. To the latter solution was added 13.0 parts of bentonite (2% based on the weight of the prepolymer), and 0.4 part of alkyl benzene sodium sulfonate (0.6% based on the weight of the prepolymer). The former solution was then added to the latter with vigorous agitation. Almost immediately solid polymer particles began to precipitate. The reaction mixture was stirred for about 5 to 10 minutes at ambient conditions, approximately 25° C. The solid polymer particles obtained were in the form of small granules which were readily dried after washing with water.

(C) Molded plastic

The product obtained from (B) above was compression molded at 154° C. and 1000 lbs./in.$^2$ pressure in the form of a sheet of 0.075 inch thickness. The molding cycle could be repeated numerous times without significant effect on the physical properties of the product which were as follows:

Shore A Hardness, degrees _____ 87
Tensile (lbs./in.$^2$) _____ 3410
Elongation at break, percent _____ 800
Modulus (lbs./in.$^2$)
  100% _____ 740
  300% _____ 1000 ture and a pressure of 1000 lbs./in.$^2$, a sheet of 0.075 inch was prepared which had the following properties:

Shore Hardness A _____ 87
Tensile _____ 5800
Elongation _____ 850
Modulus:
  100% _____ 900
  300% _____ 1020

This example represents a preferred embodiment of the present invention and shows that chain stopping monofunctional amines and dispersing agents are not necessary in the present invention.

EXAMPLES 3-8

Following the procedure of Example 1, a number of prepolymers were prepared, converted to the polyurethane-ureas with various diamines, and molded. All of the polymers obtained were capable of being compression molded repeatedly at 154° C. without significant decomposition. The various prepolymers, diamines, and physical properties of the molded polymers are listed in Table I.

The various examples represent embodiments of the present invention and illustrate the effective use of various ingredients within the scope of the invention.

TABLE I

| Ex. | Prepolymer composition | NCO, percent | Diamine employed | Chain Stopper | Solvent | Physical properties of molded thermoplastic ||||
|-----|----|----|----|----|----|----|----|----|----|
| | | | | | | Hardness | Tensile | Elongation | Modulus 50% | Modulus 300% |
| 3 | Same as Example 2 | 4.1 | Octane-1,8- | None | THF | 87 | 4,480 | 830 | [1] 830 | 930 |
| 4 | Poly(ethylene adipate)+ methylenebis (4-phenyl isocyanate). | 3.11 | Hexane-1,6 | Diethylamine | THF+AN | 85 | 5,000 | 700 | 910 | 2,100 |
| 5 | Poly(ethylene adipate)+ 80/20 2,4- and 2,6- tolylene diisocyanate. | 3.98 | 70/30 m- and p-xylylene-. | do | AN | 95 | 6,200 | 680 | 1,200 | 1,550 |
| 6 | Same as Example 2 | 4.1 | m-xylylene | do | DMF | 93 | 4,950 | 675 | 970 | 1,375 |
| 7 | Poly(tetramethylene glycol)ether+2,4- tolylene diisocyanate. | 4.2 | m-xylylene | do | AN | 90 | 2,150 | 650 | 950 | 1,210 |
| 8 | Poly(ethylene adipate) poly(tetramethylene glycol)ether and 2,4- tolylene diisocyanate. | 4.22 | 70/30 m- and p-xylylene-. | Benzylamine | DMF | 92 | 4,100 | 810 | 870 | 1,085 |

[1] 100% modulus.
Solvents=THF—tetrahydrofuran; AN—acetonitrile; DMF—dimethylformamide.

This example represents a preferred embodiment of the present invention.

EXAMPLE 2

To 3750 parts (1.9 moles, 3.8 equivalents) of a hydroxyl-terminated poly(ethylene adipate) of molecular weight 1975 and 1505 parts (2.45 moles, 4.9 equivalents) of a similar compound of molecular weight 615 was added 1360 parts (7.82 moles, 15.64 equivalents) of 2,4-tolylene diisocyanate (equivalent ratio of 1.8 NCO/1.0 OH). The mixture was reacted at 60° C. for 16 hours with stirring and cooled. The final prepolymer had an isocyanate content of 4.1% and virtually no unreacted diisocyanate, i.e. less than about 0.5%.

40 parts of the above prepolymer were dissolved in 180 parts of acetonitrile. Another solution containing 1.813 parts of butane-1,4-diamine (1.04 equivalent per NCO equivalent) in 142 parts of acetonitrile and 395 parts of water was prepared. While stirring the amine solution with a Waring Blendor, the prepolymer solution was added. Almost immediately solid polymer particles began to precipitate. The reaction mixture was stirred for about 5 to 10 minutes at ambient conditions, approximately 25° C. The solid polymer particles were in the form of small granules which were readily dried after washing with water.

The dried polymer was capable of being molded in a press at 154° C. repeatedly. Employing this tempera-

We claim:

1. A process for the preparation of a thermoplastic polyurethane-urea molding composition of an essentially linear structure which comprises a plurality of structural units having the formula:

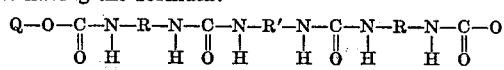

wherein Q represents the residue on removal of the terminal hydroxyl groups from a hydroxyl-terminated polyester or polyether; R is a divalent aromatic radical; and R' is a divalent organic radical in which at least the terminal members are aliphatic; said composition having a melt-flow temperature in the range of 100 and 180° C. and being capable of repeated shapings by injection or compression molding techniques without significant decomposition: said process consisting essentially of addition of a 10 to 75% solution of an isocyanate-terminated polyester or polyether intermediate containing less than 1% unreacted diisocyanate in water-miscible solvent, to from about 0.1 to 5.0% solution of a diamine in a mixture of water and water-miscible solvent in the presence of high-speed, high-shear agitation, said solvent being capable of dissolving said isocyanate-terminated polyester or polyether, whereby said molding composition is formed as an easily dried, granular product.

2. The process of claim 1 wherein a dispersing agent is added to said solution of the diamine.

3. The process according to claim 1 wherein a diethylamine chain stopper is added to said solution of the diamine.

4. The process according to claim 1 above wherein an amine equivalency up to 50% in excess of the isocyanate equivalency is employed.

References Cited

UNITED STATES PATENTS

| | | | |
|---|---|---|---|
| 2,929,800 | 3/1960 | Hill | 260—77.5 |
| 2,968,575 | 1/1961 | Mallonee | 106—287 |
| 3,148,173 | 9/1964 | Alexrood | 260—75 |
| 3,180,854 | 4/1965 | Schneider et al. | 260—77.5 |
| 3,190,766 | 6/1965 | Yuan | 117—63 |
| 3,236,812 | 2/1966 | McElroy | 260—75 |
| 3,379,683 | 4/1968 | Booth | 260—47 |
| 3,384,624 | 5/1968 | Heiss | 260—77.5 |

DONALD E. CZAJA, Primary Examiner

H. S. COCKERAM, Assistant Examiner

U.S. Cl. X.R.

260—77.5